(12) United States Patent  
Chuang

(10) Patent No.: US 6,457,496 B1  
(45) Date of Patent: Oct. 1, 2002

(54) LIQUID DISPENSING AND METERING SYSTEM

(75) Inventor: Hsu-Chen Chuang, Taipei (TW)

(73) Assignee: Copower Technology Co., Ltd., Taipei Hsien (TW)

( * ) Notice: Subject to any disclaimer, the term of this patent is extended or adjusted under 35 U.S.C. 154(b) by 0 days.

(21) Appl. No.: 09/900,906

(22) Filed: Jul. 10, 2001

(51) Int. Cl.$^7$ .............................. B65B 1/30; B65B 3/26
(52) U.S. Cl. ......................... 141/83; 141/94; 141/100; 141/104; 141/144; 222/144.5
(58) Field of Search .................. 141/83, 94, 95, 141/99–105, 144; 222/144, 144.5, 334, 387; 177/70, 145

(56) References Cited

U.S. PATENT DOCUMENTS 3,878,907 A * 4/1975 Morick ...................... 141/100
5,115,874 A * 5/1992 Hayahara et al. ........... 177/145
5,938,080 A * 8/1999 Haaser et al. ................ 141/104

* cited by examiner

Primary Examiner—Timothy L. Maust
(74) Attorney, Agent, or Firm—Rosenberg, Klein & Lee

(57) ABSTRACT

A liquid dispensing and metering system including a tubeless dispensing module is disclosed. The liquid dispensing and metering system includes a turntable table supported and rotated by a driving mechanism. A plurality of solution bottles are positioned on the turntable table, each of which being mounted with an electromagnetic valve. At least one actuating unit is arranged to energize the electromagnetic valves of the solution bottles to allow the liquid material contained in the solution bottles to be flowed out via the electromagnetic valves. At least one electronic scale with a beaker is arranged under the turntable table for measuring the liquid material received in the beakers. The driving mechanism includes a liftable supporting mechanism for moving the turntable table upwardly or downwardly with respect to the electronic scale.

18 Claims, 23 Drawing Sheets

LIQUID DISPENSING AND METERING SYSTEM

BACKGROUND OF THE INVENTION

1. Field of the Invention

The present invention relates to a liquid dispensing and metering system, and more particularly to a liquid dispensing and metering system with a tubeless configuration.

2. Description of the Prior Art

Automatic liquid material metering systems are commonly used in various industry fields, such as chemical industry and textile dying industry, is for measuring the volume of liquid material. FIG. 1 shows a conventional liquid dispensing and metering system, generally indicated at 10, mainly including a casing 11, a supporting platform 12, and a turntable table 13. The supporting platform 12 is fixedly mounted on the casing 11, and the turntable table 13 is positioned in an inner space defined by the casing 11 and the supporting platform 12.

A number of solution bottles 14 are supported and arranged on the supporting platform 12, capable of containing selected dye solution or chemical solution therein. Besides, a number of beakers 15 are supported on the turntable table 14 in the manner of circular arrangement.

With reference to FIG. 2, the turntable table 13 is supported by a central shaft 131 and can be rotated by a driving motor 132 through the central shaft 131. An electronic scale 16 is disposed under the turntable table 13. Each of the solution bottles 14 is respectively connected with a pipe 141 at its top open end to a dispensing head assembly 142 located above the turntable table 13. The dispensing head assembly 142 includes a plurality of dispensing heads. So, under control of a controller (not shown) of the system, the liquid material contained in the solution bottles 14 may be selectively drawn out of the respective solution bottle through the pipe 141 connected therebetween, and then dripped down into a selected beaker 15 via the dispensing head assembly 142. The weight of the liquid material received in the beaker 15 may be measured by the electronic scale 16.

It is noted that the liquid material, especially solution with high viscosity, is easy to be retained in the pipes, causing a deposit. The residual solution in the pipe will cause an improper precision of weight when measuring. Therefore, a measuring error tends to occur after long uses of the metering system. This deposit problem becomes more serious when the solution bottles is used to hold a liquid of high viscosity.

It is thus desirable to have an improved liquid dispensing and metering system to eliminate the problems discussed above.

SUMMARY OF THE INVENTION

Accordingly, a primary object of the present invention is to provide a liquid dispensing and metering system with a tubeless configuration. The liquid dispensing and metering system includes a turntable table supported and rotated by a liftable supporting mechanism. A plurality of solution bottles positioned on the turntable table, each of which being mounted with an electromagnetic valve. At least one actuating unit is used to actuate the electromagnetic valves of the solution bottles to allow the liquid contained in the solution bottles to be flowed out via the electromagnetic valves. An electronic scale is arranged under the turntable table, corresponding to at least one electromagnetic valve of the solution bottles, for measuring the liquid dropped into the beakers from the solution bottles.

The other object of the present invention is to provide a high speed liquid dispensing and metering system. Three or more electronic scales may be arranged under the turntable table, capable of increasing the measuring speed of the liquid dispensing and metering system.

The other object of the present invention is to provide a liquid dispensing and metering system with a vertically movable turntable table. The turntable table is driven by a liftable supporting mechanism, so that the turntable table may be moved upwardly or downwardly to facilitate the operation of the system.

The other object of the present invention is to provide a customized liquid dispensing and metering system, including one or more turntable table modules, tubeless dispensing modules, and/or piped dispensing modules.

The present invention will be apparent to those skilled in the art by reading the following description of preferred embodiments thereof, with reference to the accompanying drawings, in which:

DETAILED DESCRIPTION OF THE PREFERRED EMBODIMENTS

Figure 3:
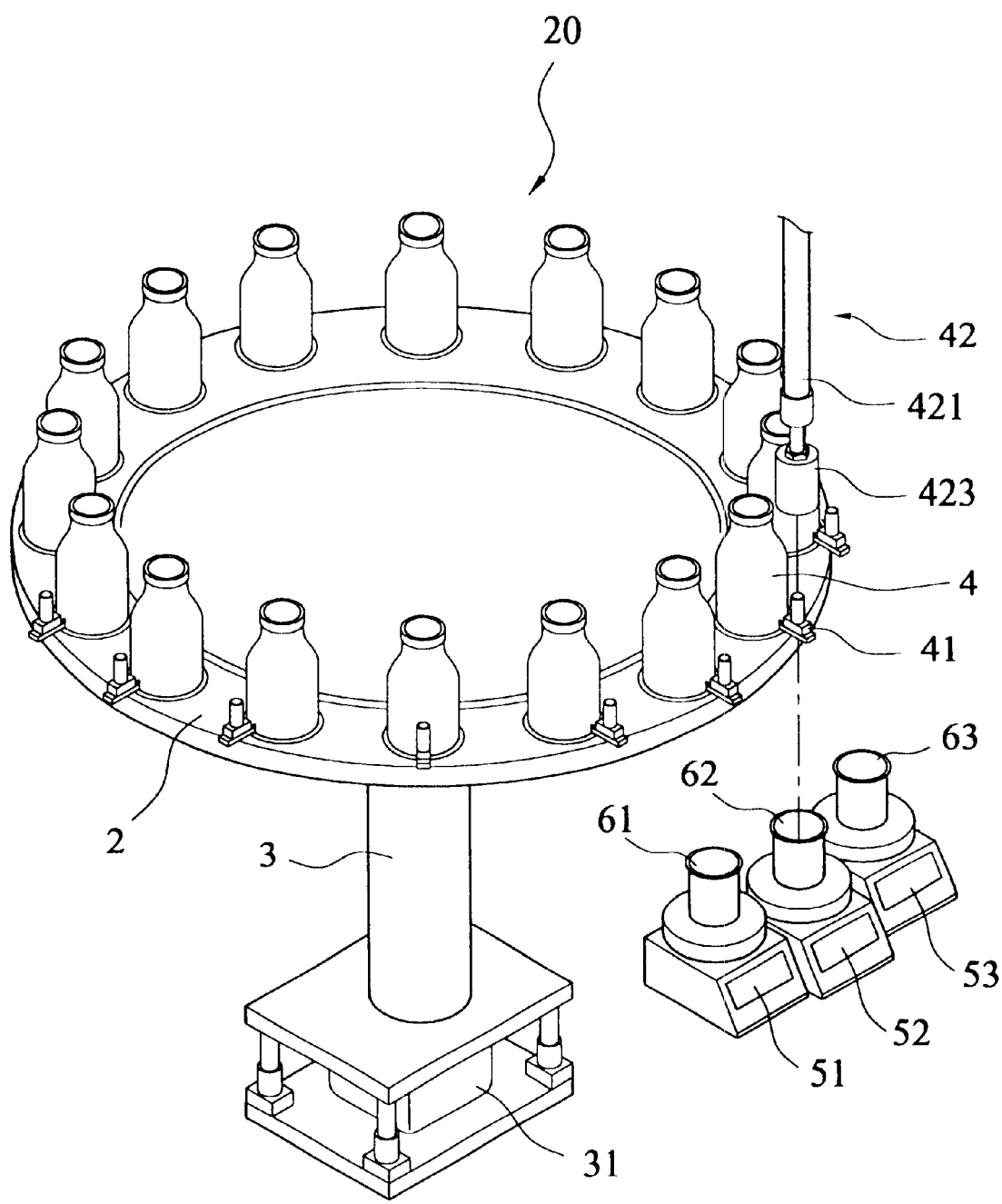
FIG. 3 is a perspective view showing a liquid dispensing and metering system in accordance with a first embodiment of the present invention.
Figure 4:
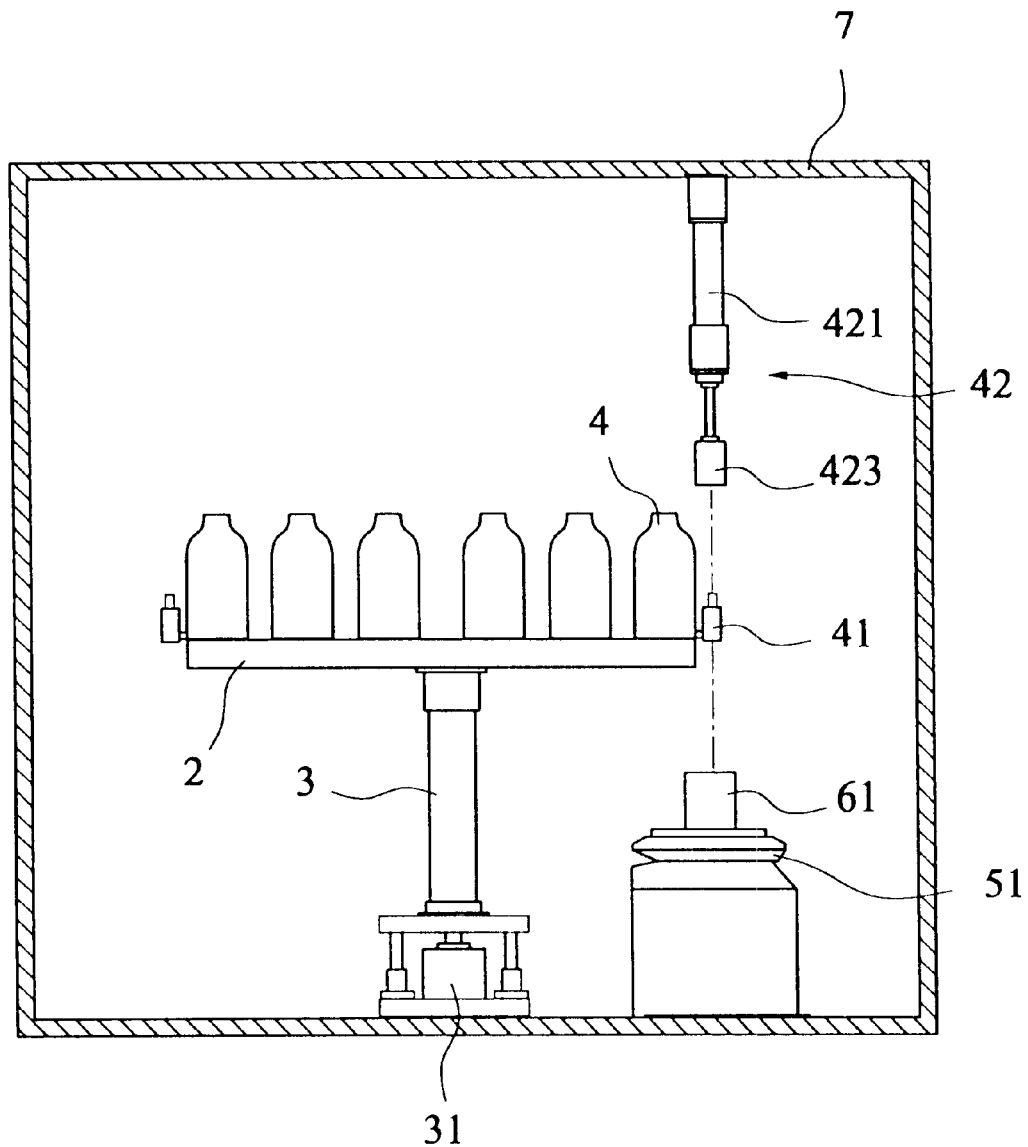
FIG. 4 is a front plan view of the liquid dispensing and metering system of FIG. 3.

Referring to FIG. 3, it shows a tubeless liquid dispensing and metering system in accordance with a first embodiment of the present invention. FIG. 4 is a front plan view of the liquid dispensing and metering system of FIG. 3.

As shown in the drawings, a turntable table 2 is driven by a driving system including a central shaft 3 and a driving motor 31. The turntable table 2 is supported by the central shaft 3 and rotated about the central shaft 3 by a driving motor 31. Alternatively, the driving system may include a known transmission belt (not shown) and/or a transmission gear assembly for transmitting the mechanical rotating force of the driving motor to the turntable table.

A number of solution bottles 4 are supported on the turntable table 2 in The manner of circular arrangement, and each of which contains selected dye solution or chemical solution therein.

Each of the solution bottles 4 is provided with an electromagnetic valve 41 formed on a bottom edge thereof and protruded from the peripheral edge of the turntable table 2. An actuating unit 42 is arranged above the turntable table 2 and aligned with the electromagnetic valve 41 of a selected solution bottle 4. The actuating unit 42 may be simply mounted on a casing 7 of the liquid dispensing and metering system, with reference to FIG. 4.

A plurality of electronic scales 51, 52, and 53 adjacent to each other are disposed under the turntable table 2 and along the peripheral edge of the turntable table 2. So, the electronic scales 51, 52, and 53 are respectively corresponding to the electromagnetic valves of three continuously adjacent solution bottles.

A number of beakers 61, 62, and 63 are positioned on the electronic scales 51, 52, and 53 respectively. Under control of a control circuit (not shown) of the system, a selected solution bottle 4 may be turned to a location aligned with the actuating unit 42 and one of the beakers 61, 62, or 63.

Figure 5A:
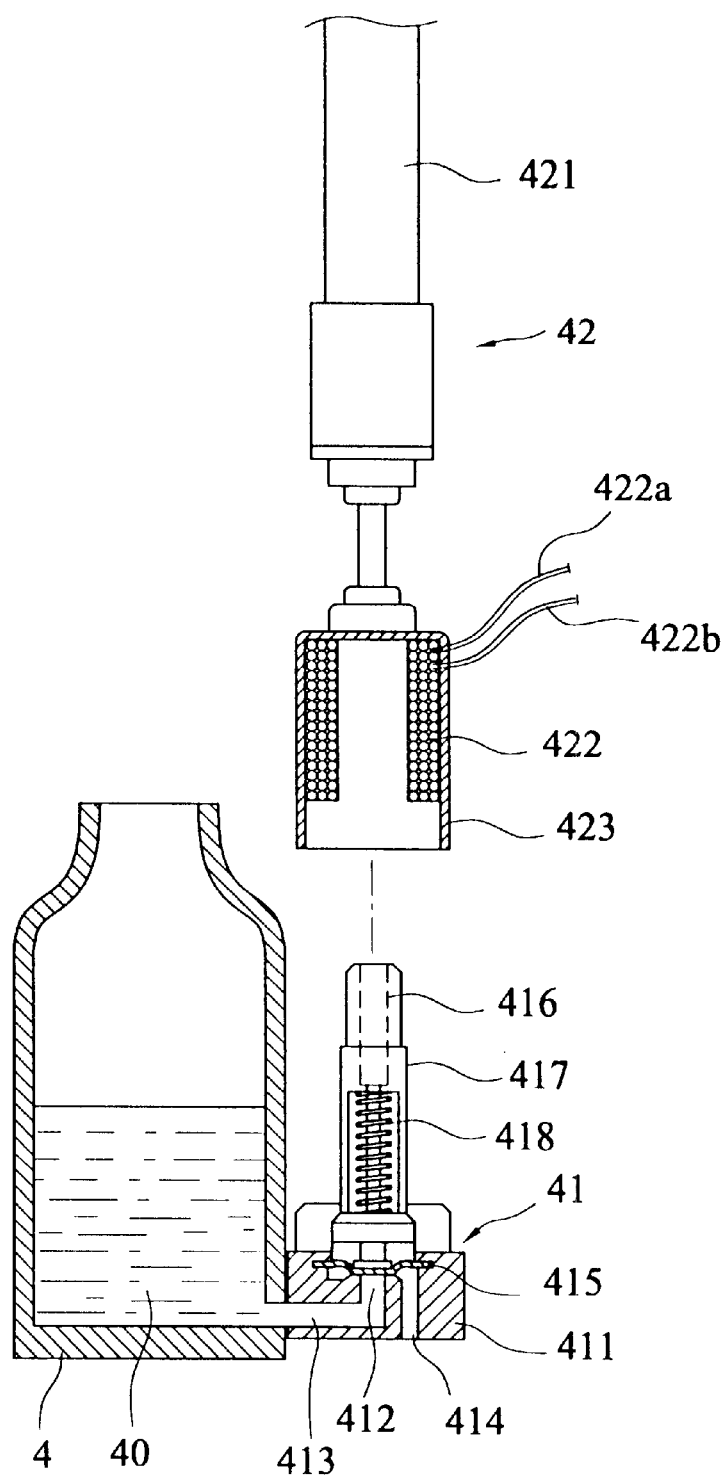
FIG. 5A is a cross-sectional view showing an electromagnetic valve of a solution bottle is at closed position under control of an actuating unit.
Figure 5B:
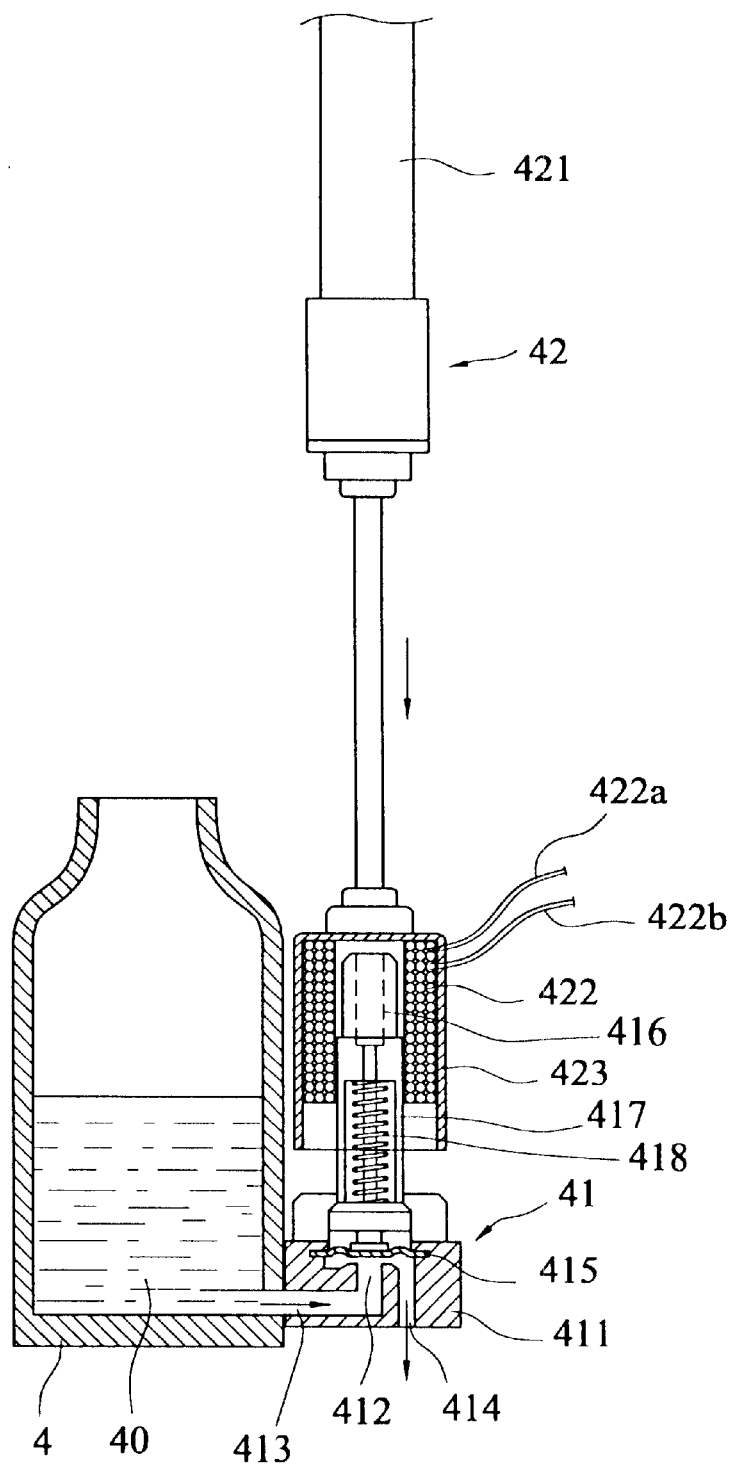
FIG. 5B is a cross-sectional view showing an electromagnetic valve of a solution bottle is at open position under control of an actuating unit.

With reference to FIGS. 5A and 5B, the electromagnetic valve 41 of the solution bottle 4 comprises a valve base 411 with a flow channel 412 therein. An inlet 413 is formed on a side wall of the valve base 411 and communicated with the flow channel 412. An outlet 414 is formed on a bottom side of the valve base 411 and communicated with the flow channel 412. A diaphragm 415 is disposed in the flow channel 412 between the inlet 413 and the outlet 414 for controlling the liquid material 40 contained in the solution bottle 4 flowing from the inlet 413 to the outlet 414. It is known that the diaphragm 415 may be replaced with a plug (not sown) made of suitable material such as rubber.

A movable shaft 416 made of magnetic material is contained in a sleeve 417. The bottom end of the movable shaft 416 is extended into the flow channel 412 of the valve base 411, and then mechanically coupled with the diaphragm 415. A spring 418 is mounted in the sleeve 417 and surrounding on the movable shaft 416 for providing a bias force to the movable shaft 416.

The actuating unit 42 includes a hydraulic or pneumatic cylinder 421, a coil 422, and a mask 423 having a bottom open end. The top end of the mask 423 is fixedly mounted on the bottom end of a moveable shaft of the cylinder 421. The coil 422 is accommodated in the mask 423 and electrically connected with a pair of conductive wires 422a and 422b. The coil 422 may be energized by an electrical power source through the conductive wires 422a and 422b.

The actuating unit 42 may be either at an extended position or a return position. When the actuating unit 42 is at the extended position, as shown in FIG. 5B, an electrical power source may be supplied to the coil 422 of the actuating unit 42 via the conductive wires 422a and 422b, so that the electromagnetic valve 41 of the solution bottle 4 is energized. At this time, the solution contained in the solution bottles 4 may be flowed out via the electromagnetic valve 41. On the contrary, when the power source supplied to the coil 422 of the actuating unit 42 is turned off, the electromagnetic valves 41 of the solution bottles 4 is not energized, so as to stop the flowing of the solution from the solution bottle 4. Then, the actuating unit 42 may be returned to the return position, as shown in FIG. 5A. The weight of the liquid material received in the beakers 61, 62, and 63 may be measured by the electronic scales 51, 52, and 53 respectively.

Figure 6:
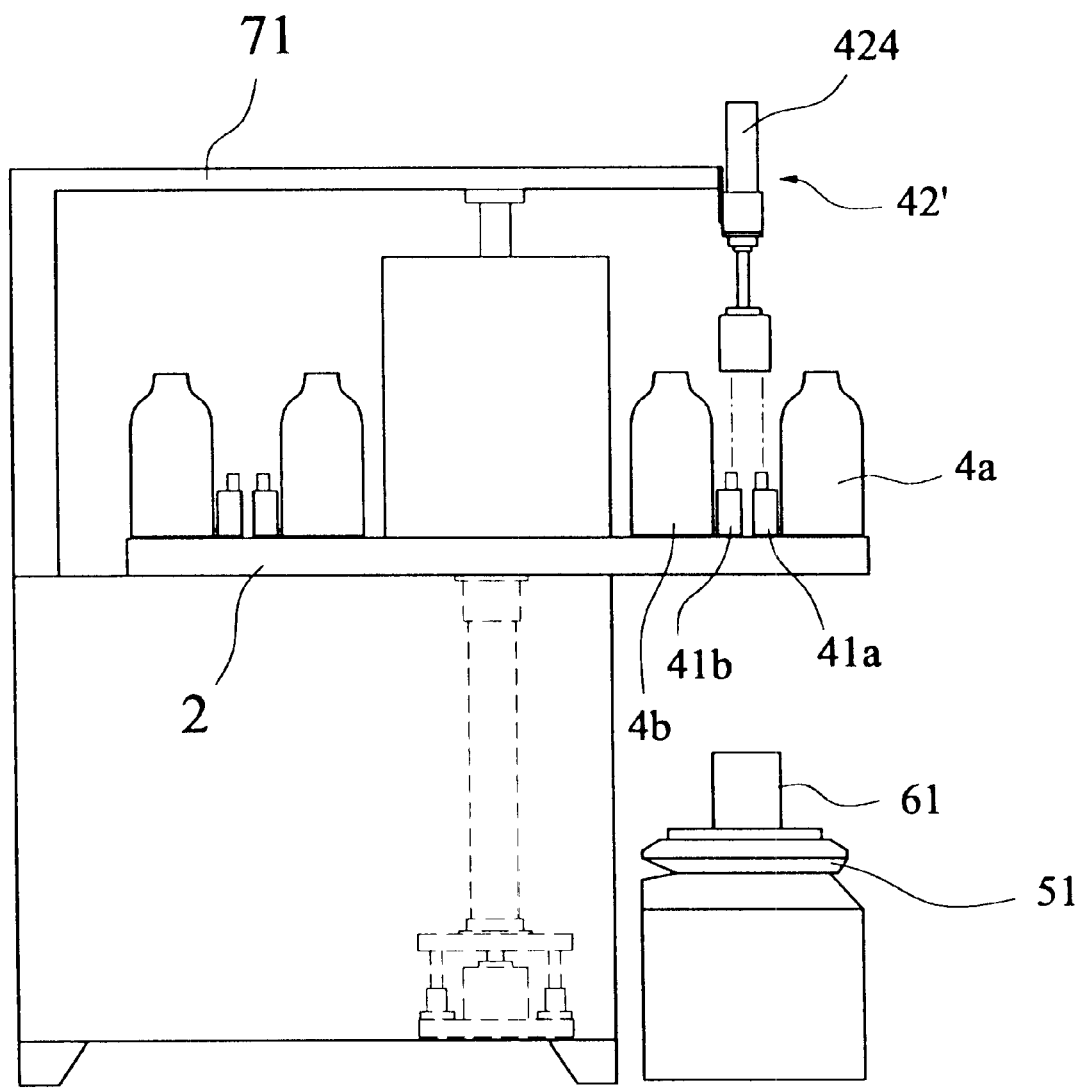
FIG. 6 is a plan view showing an actuating unit mounted with a pair of coils capable of controlling two electromagnetic valves of two adjacent solution bottles in accordance with a second embodiment of the present invention.

In a second embodiment of the present invention, the solution bottles 4 may be divided into an outer circular group and an inner circular group, as shown in FIG. 6. The same reference numbers used in the previous drawing will be used to refer to the same or like parts.

The outer circular group includes a number of outer solution bottles 4a arranged on an outer circular line of the turntable table 2. Each of the outer solution bottles 4a is provided with an electromagnetic valve 41a facing to the center of the turntable table 2. The inner circular group includes a number of inner solution bottles 4b arranged on an inner circular line of the turntable table 2, adjacent to the outer circular group. Each of the inner solution bottles 4b is provided with an electromagnetic valve 41b facing to the peripheral edge of the turntable table 2 and corresponding to an outer solution bottle 4a of the outer solution group. So, a number of solution bottle pairs, each of which is composed of an outer solution bottles 4a and a corresponding inner solution bottles 4b, are arranged on the turntable table 2.

Figure 7:
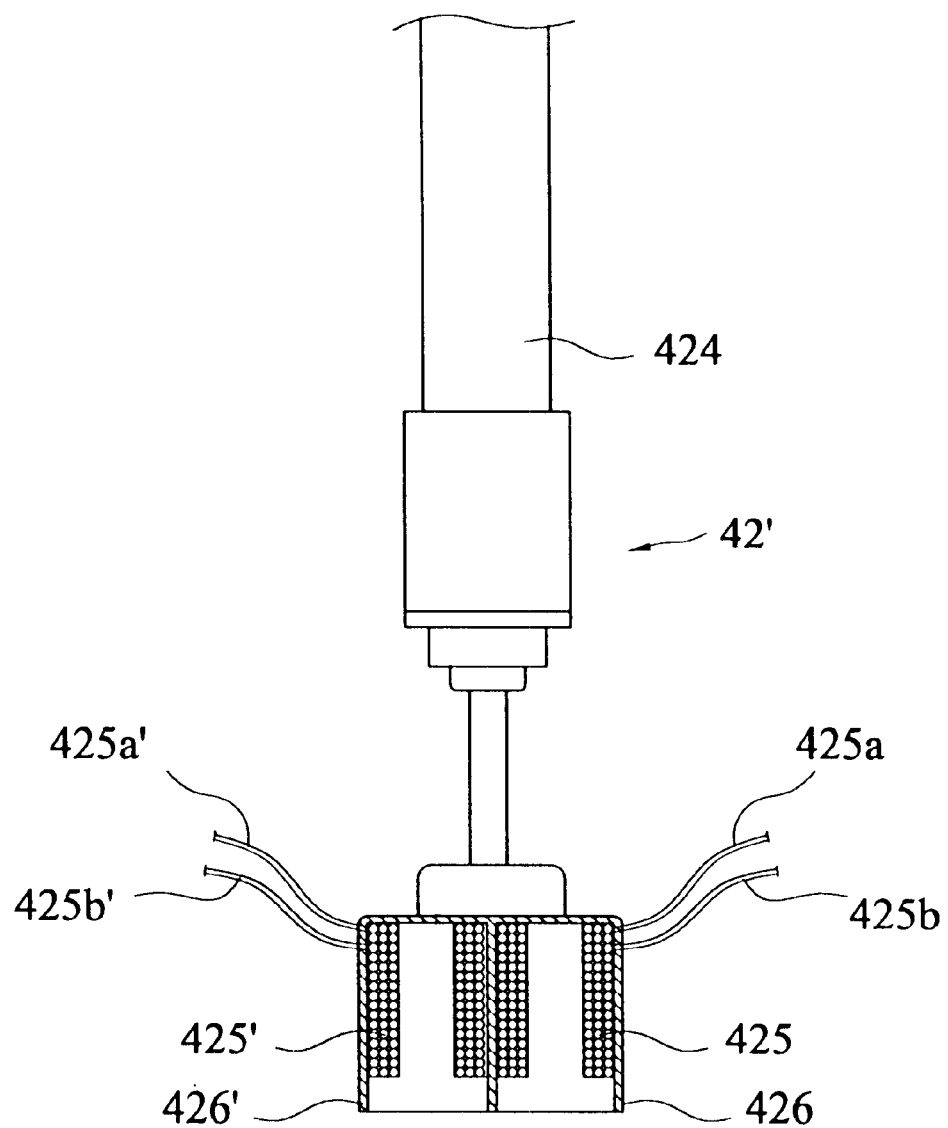
FIG. 7 is a cross-sectional view showing that the actuating unit of FIG. 6 is mounted with a pair of coils therein.

In order to control the solution bottle pair of this embodiment, a dualcoil actuating unit 42' is provided, as shown in FIG. 7. The dual-coil actuating unit 42' includes a cylinder 424, a first coil 425 connected with a pair of conductive wires 425a and 425b, a second coil 425' connected with a pair of conductive wires 425a' and 425b', a first mask 426, and a second mask 426'. The dual-coil actuating unit 42' is vertically supported by a rack 71 and aligned with the electromagnetic valve 41a, 41b, and a beaker 61 supported on an electronic scale 51, with reference to FIG. 6.

Similar to the previous embodiment, the actuating unit 42' of this embodiment may be either at an extended position or a return position. When the dual-coil actuating unit 42' is at the extended position, an electrical power source may be. supplied to coils 425 and 425' at the same time, so that the electromagnetic valve 41a and 41b of the solution bottle 4a, 4b are energized. At this time, the solution contained in the solution bottles 4a and 4b may be flowed out via the electromagnetic valve 41a and 41b respectively.

On the contrary, when the power sources supplied to the coils 425 and 425' of the actuating unit 42' are turned off, the electromagnetic valves 41a and 41b of the solution bottles 4a and 4b are not energized, so as to stop the flowing of the solution from the solution bottles 4a and 4b. Then, the actuating unit 42' may be returned to the return position.

Figure 8:
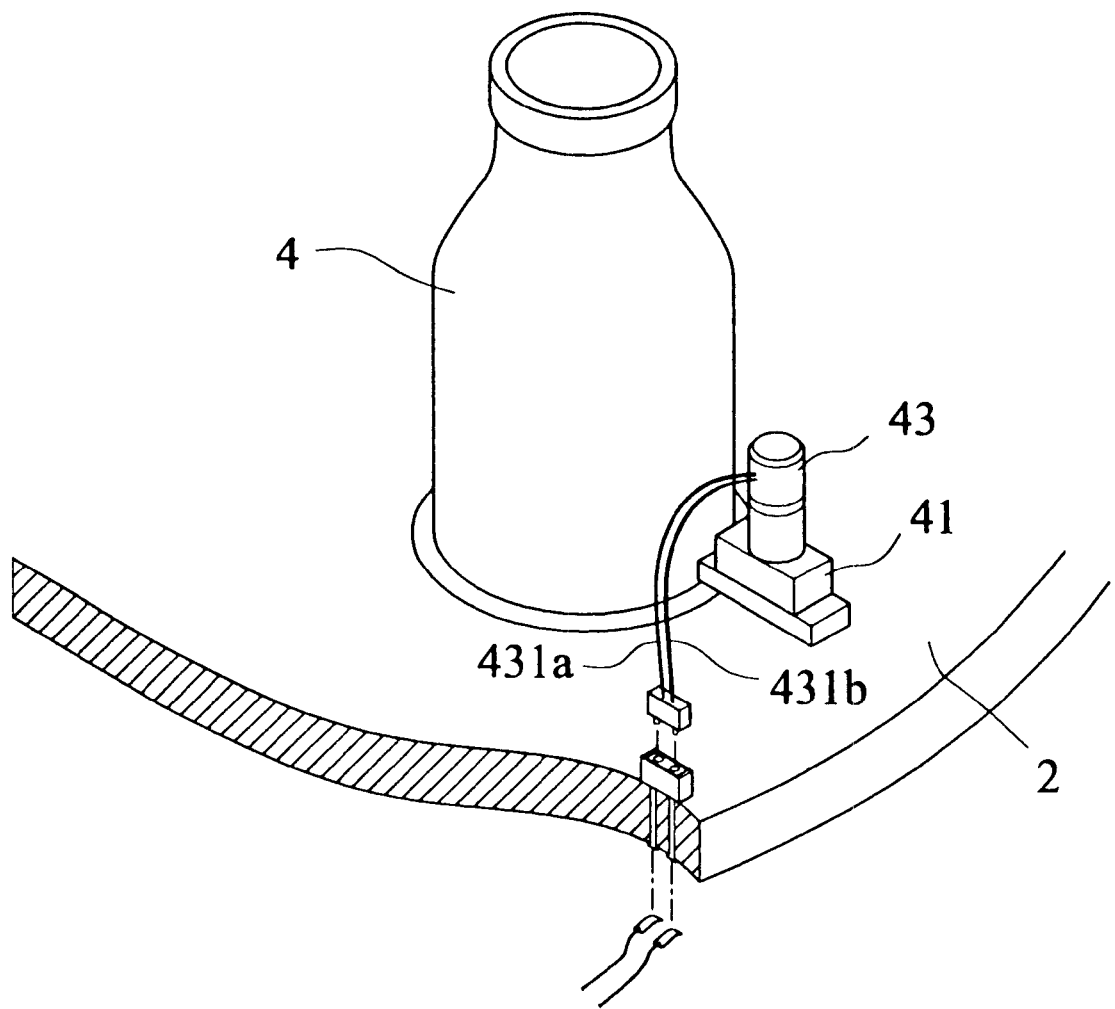
FIG. 8 is a perspective view showing an actuating unit is mounted on an electromagnetic valve of a solution bottle in accordance with a third embodiment of the present invention.
Figure 8A:
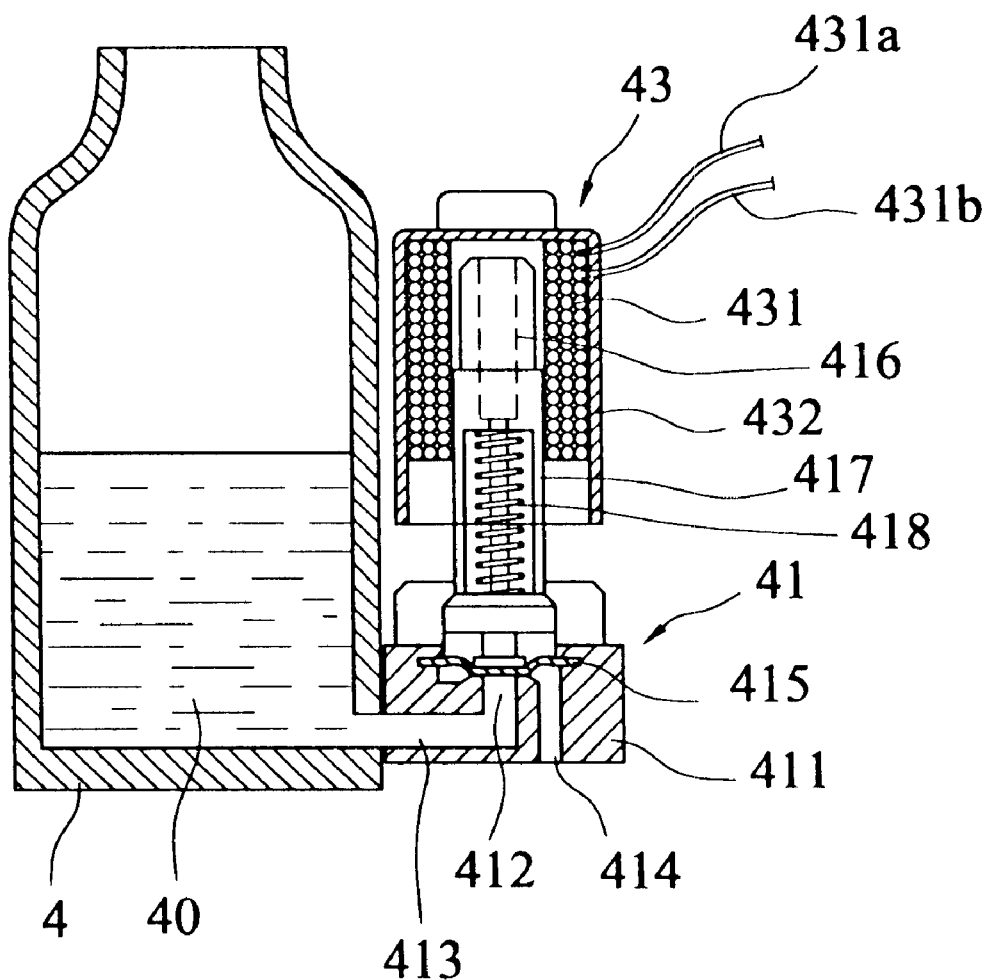
FIG. 8A is a cross-sectional view showing an electromagnetic valve of a solution bottle is at closed position under control of the actuating unit of FIG. 8.
Figure 8B:
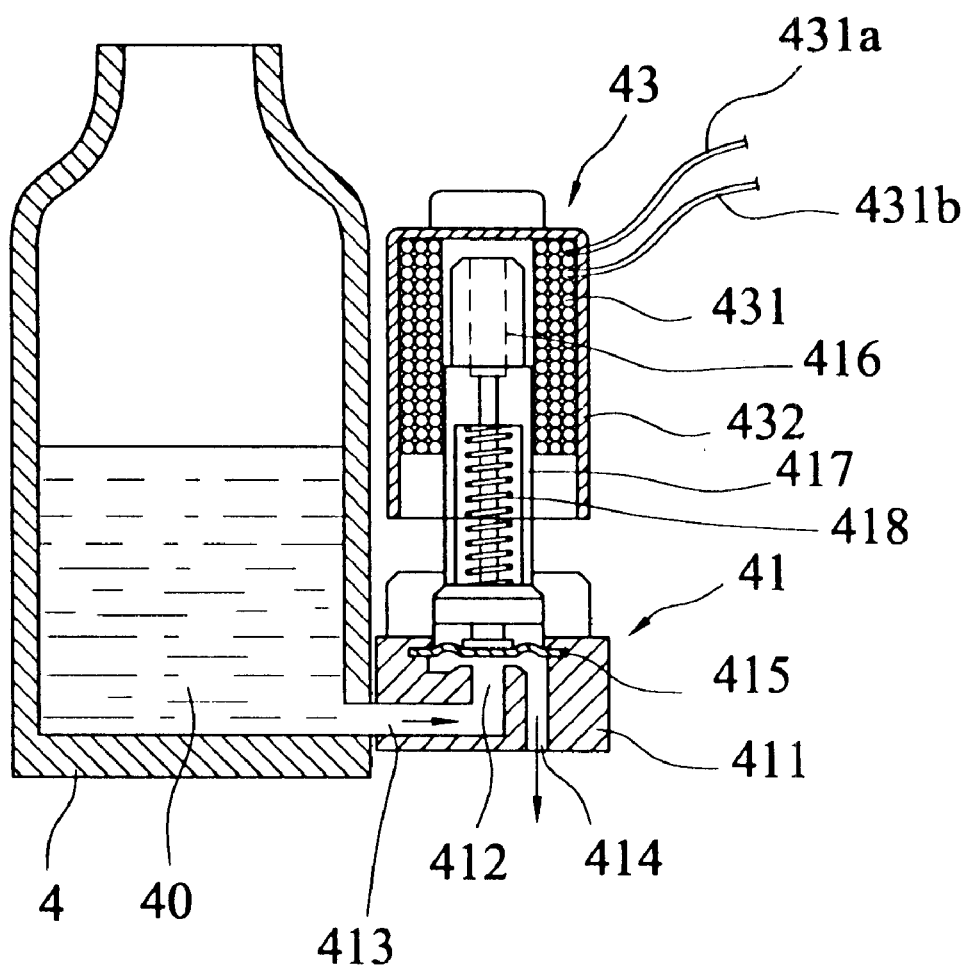
FIG. 8B is a cross-sectional view showing an electromagnetic valve of a solution bottle is at open position under control of the actuating unit of FIG. 8.

In a third embodiment of the present invention, as shown in FIGS. 8, 8A, and 8B, the actuating unit of the previous embodiments may include a coil 431 and a mask 432.

The coil 431 is accommodated in the mask 432 and then directly mounted on the top of the electromagnetic valve 41 of the solution bottle 4. The coil 431 may be energized by an electrical power source through a pair of conductive wires 431a and 431b. In this embodiment, each electromagnetic valve 41 needs to be mounted with an actuating unit for controlling.

Figure 9:
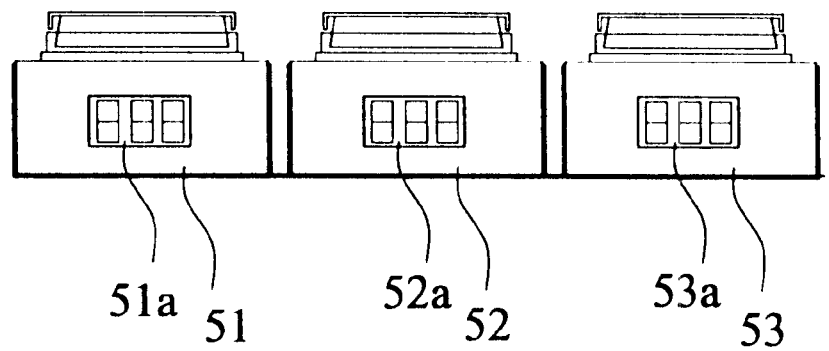
FIG. 9 is a right side plan view of FIG. 3, showing three electronic scales are arranged with the same height at their top surfaces.

The first embodiment shown in FIG. 3 is equipped with three electronic scales 51, 52, and 53 under the turntable table 2 and along the peripheral edge of the turntable table 2, forming a multiple electronic scale configuration for the tubeless liquid dispensing and metering system. Three beakers 61, 62, and 63 are positioned on the electronic scales 51, 52, and 53 respectively. The electronic scales 51, 52, and 53 are adjacent to each other and have the same height level at their top surfaces. FIG. 9 is a right side plan view showing the arrangement of the electronic scales 51, 52, and 53 of FIG. 3. The electronic scales 51, 52, and 53 are provided with displays 51a, 52a, and 53a respectively. Each of the electronic scale is provided with a weight sensing element and a control circuit therein.

Figure 10:
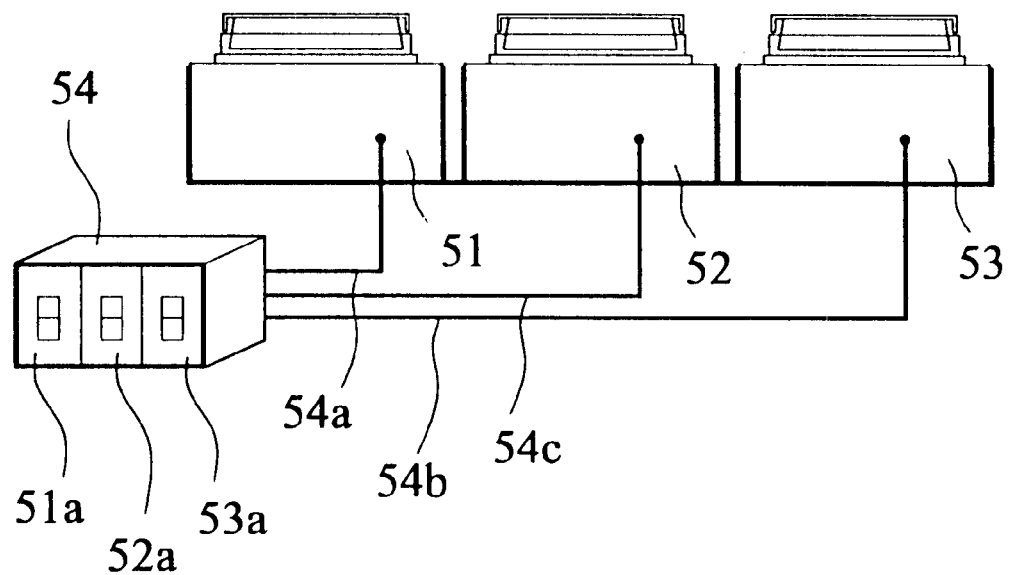
FIG. 10 shows that the displays of the electronic scales of FIG. 9 are alternatively arranged on a central controller via cables.

In alternative, with reference to FIG. 10, the displays 51a, 52a, and 53a may be arranged on a central controller 54. Only a weight sensing element is remained in the electronic scale. The control circuit of each electronic scale may be mounted in the central controller 54 via cables 54a, 54b, and 54c for receiving the weight measured by the weight sensing element of the electronic scale.

Figure 11A:
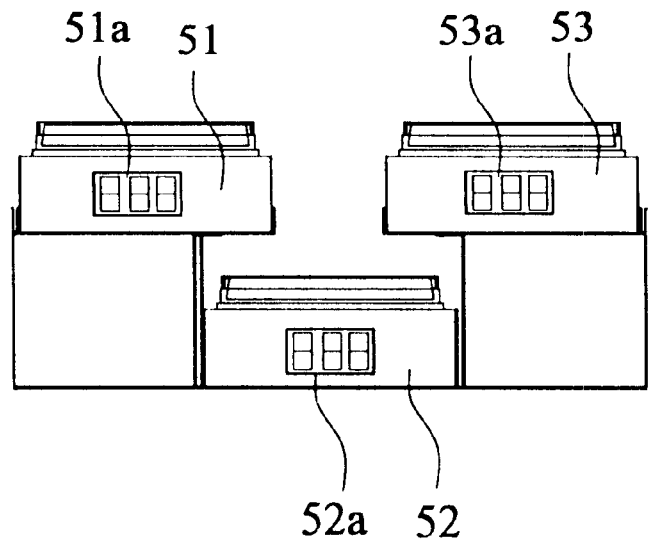
FIGS. 11A to 11C schematically show the electronic scales of the liquid dispensing and metering system may be arranged in various manners.
Figure 11B:
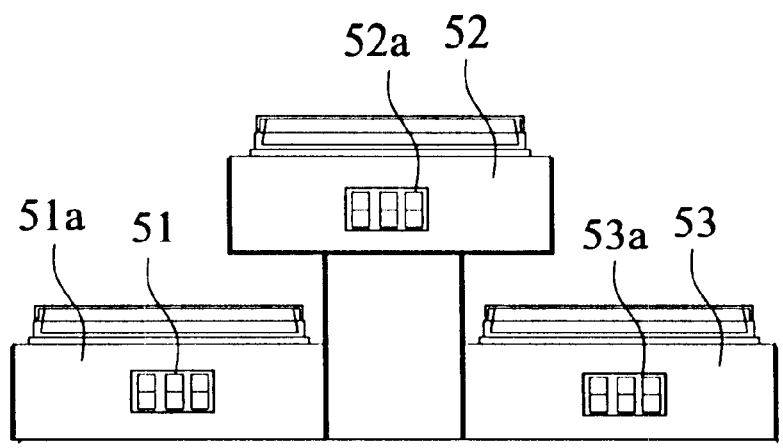
Figure 11C:
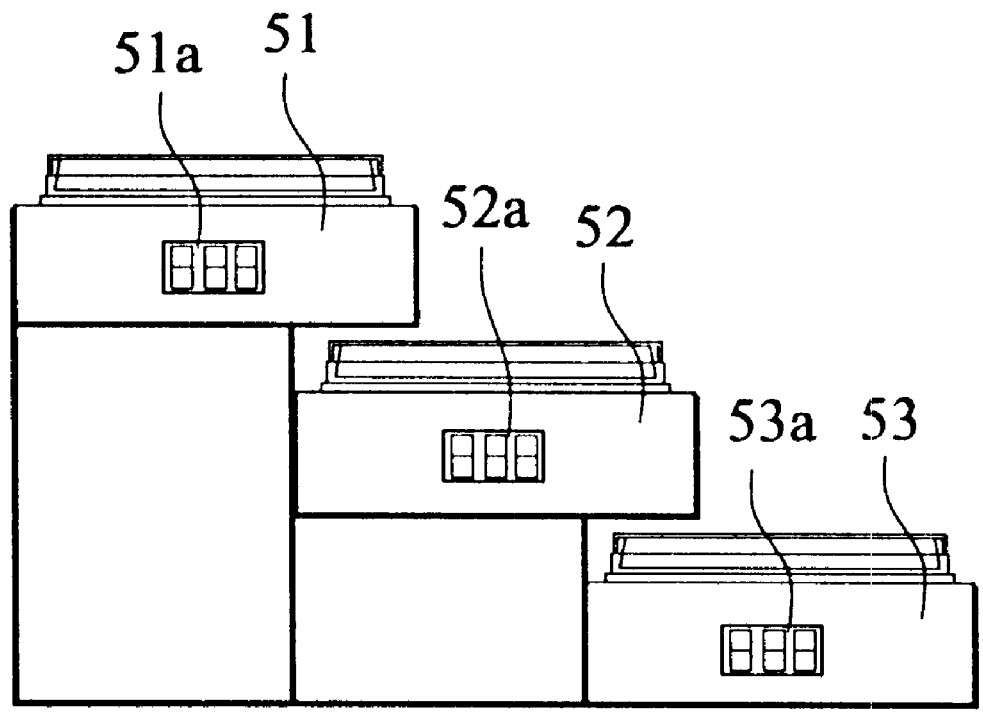

In addition to the arrangement shown in FIG. 9, the electronic scales 51, 52, and 53 may be arranged in various manners of different height at their top surfaces, as shown in FIGS. 11A, 11B, and 11C.

Figure 12:
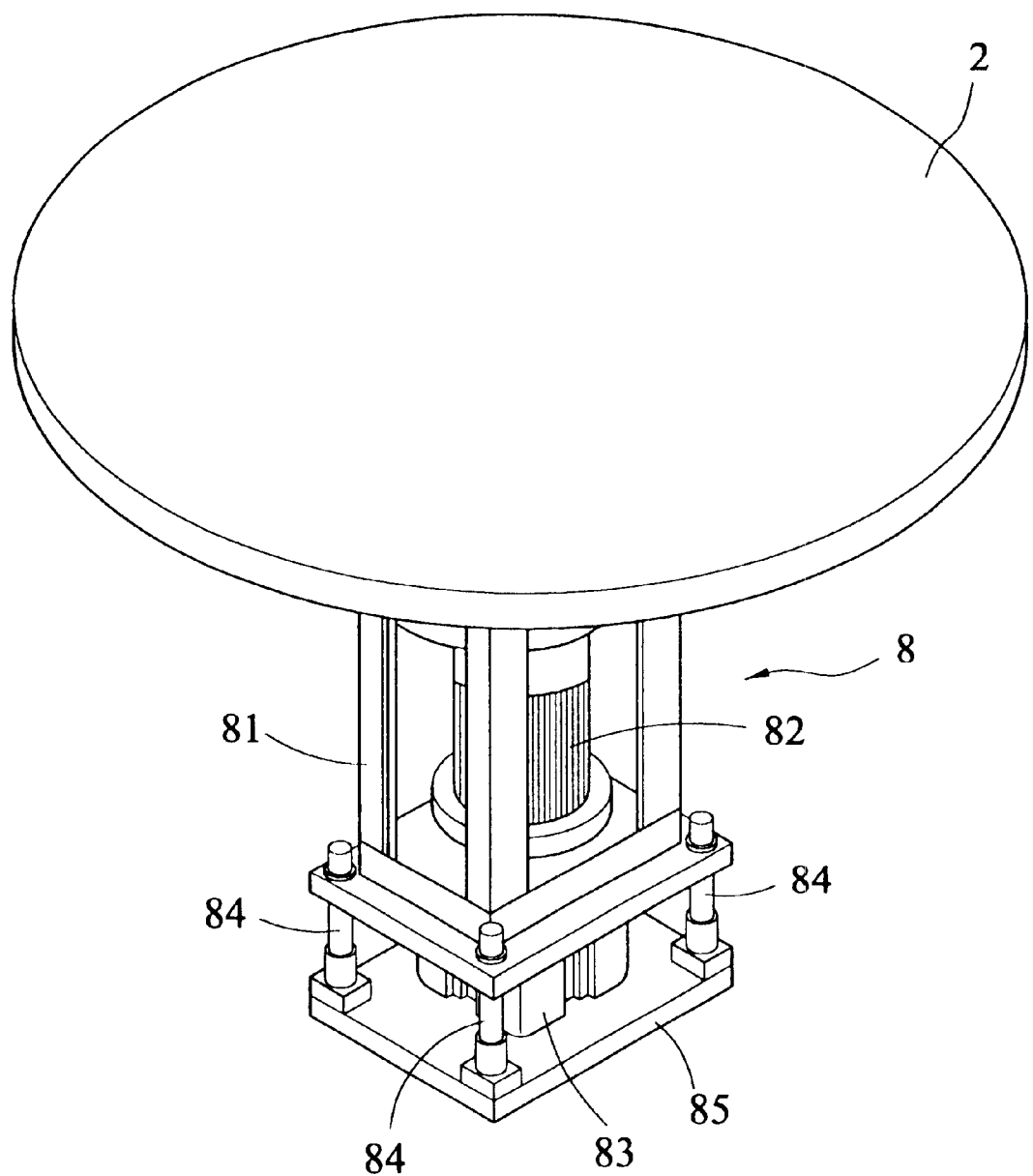
FIG. 12 is a perspective view showing the turntable table is supported by a liftable supporting mechanism in accordance with a fourth embodiment of the present invention.
Figure 12A:
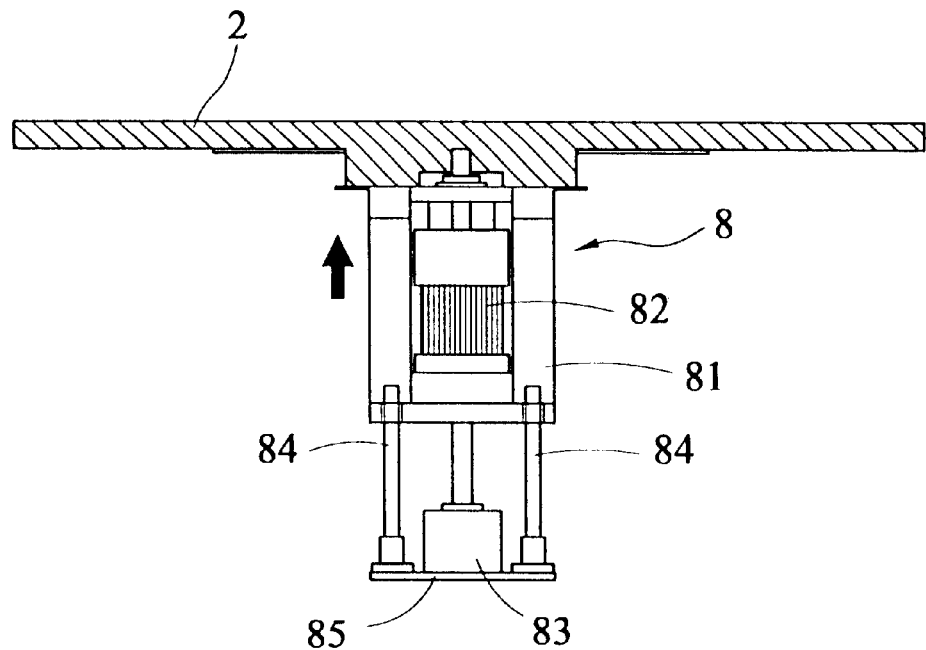
FIG. 12A is a plan view showing the turntable table is moved upwardly to an upper position.
Figure 12B:
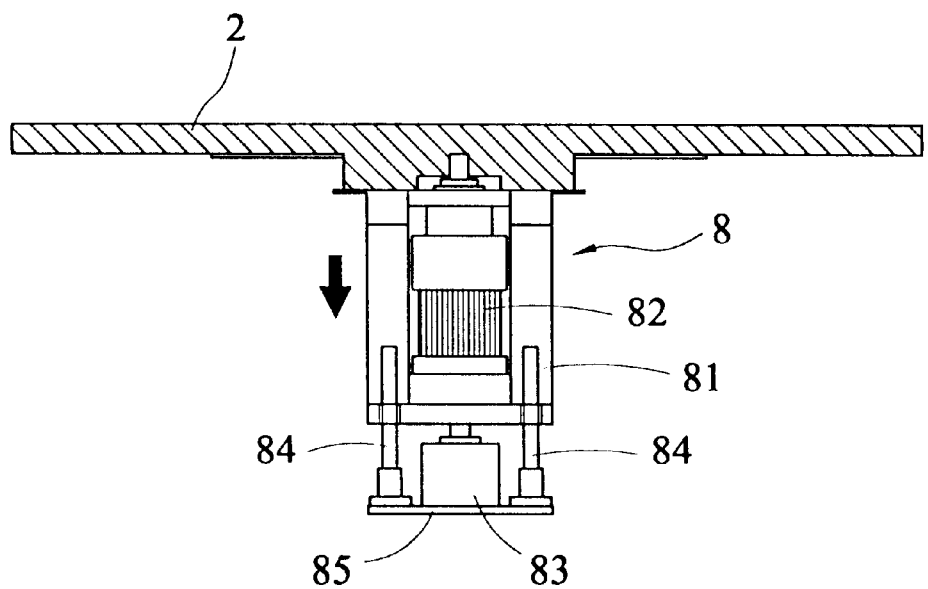
FIG. 12B is a plan view showing the turntable table is moved downwardly to a lower position.

FIG. 12 is a perspective view showing the turntable table 2 is supported by a liftable supporting mechanism 8, instead of the central shaft 3 of the previous embodiment shown in FIG. 3, in accordance with a fourth embodiment of the present invention. The liftable supporting mechanism 8 includes a supporting frame 81, a motor 82, a driving cylinder 83, four guiding rods 84, and a base 85. The rotor shaft of the motor 82 is mechanically coupled to the turntable table 2, and that the turntable table 2 may be rotated by the motor 82. In addition, the turntable table 2 may be moved upwardly to an upper position as shown in FIG. 12A, or downwardly to a lower position as shown in FIG. 12B. By means of this design, the turntable table 2 may be moved upwardly or downwardly with respect to the beaker positioned on the electronic scale.

Figure 1:
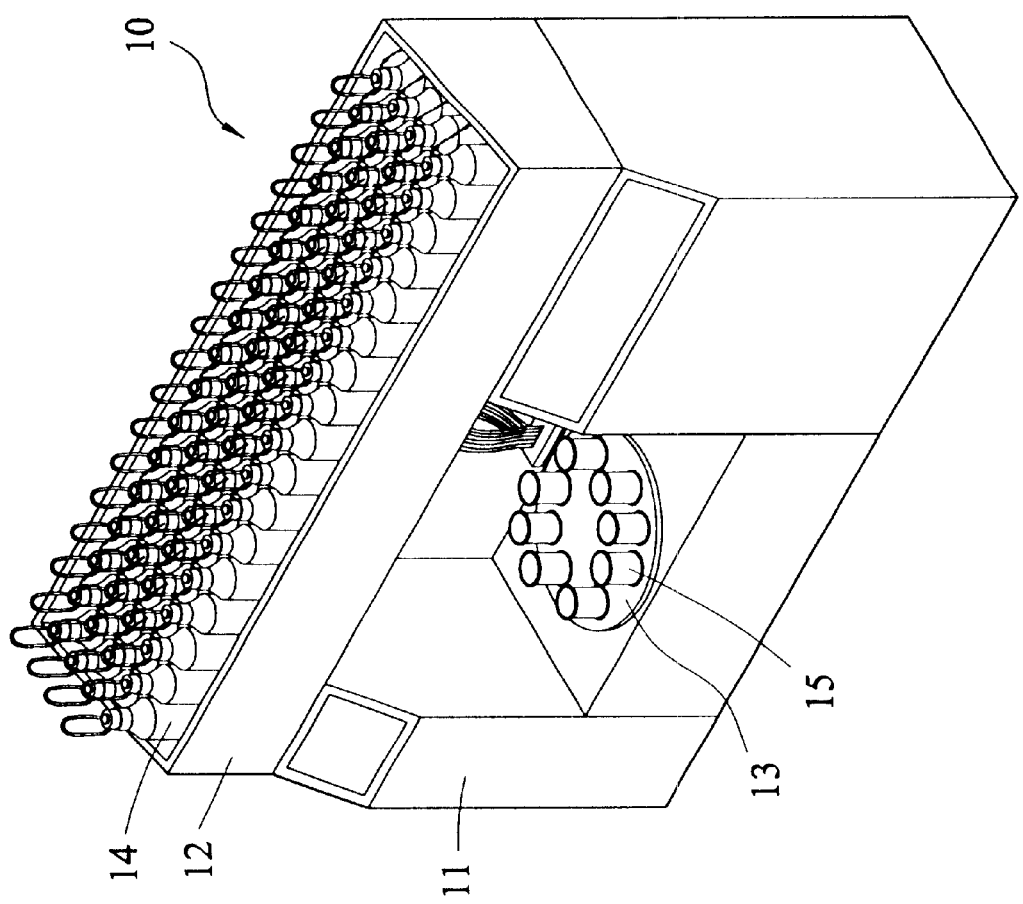
FIG. 1 is a perspective view showing a conventional liquid dispensing and metering system.
Figure 2:
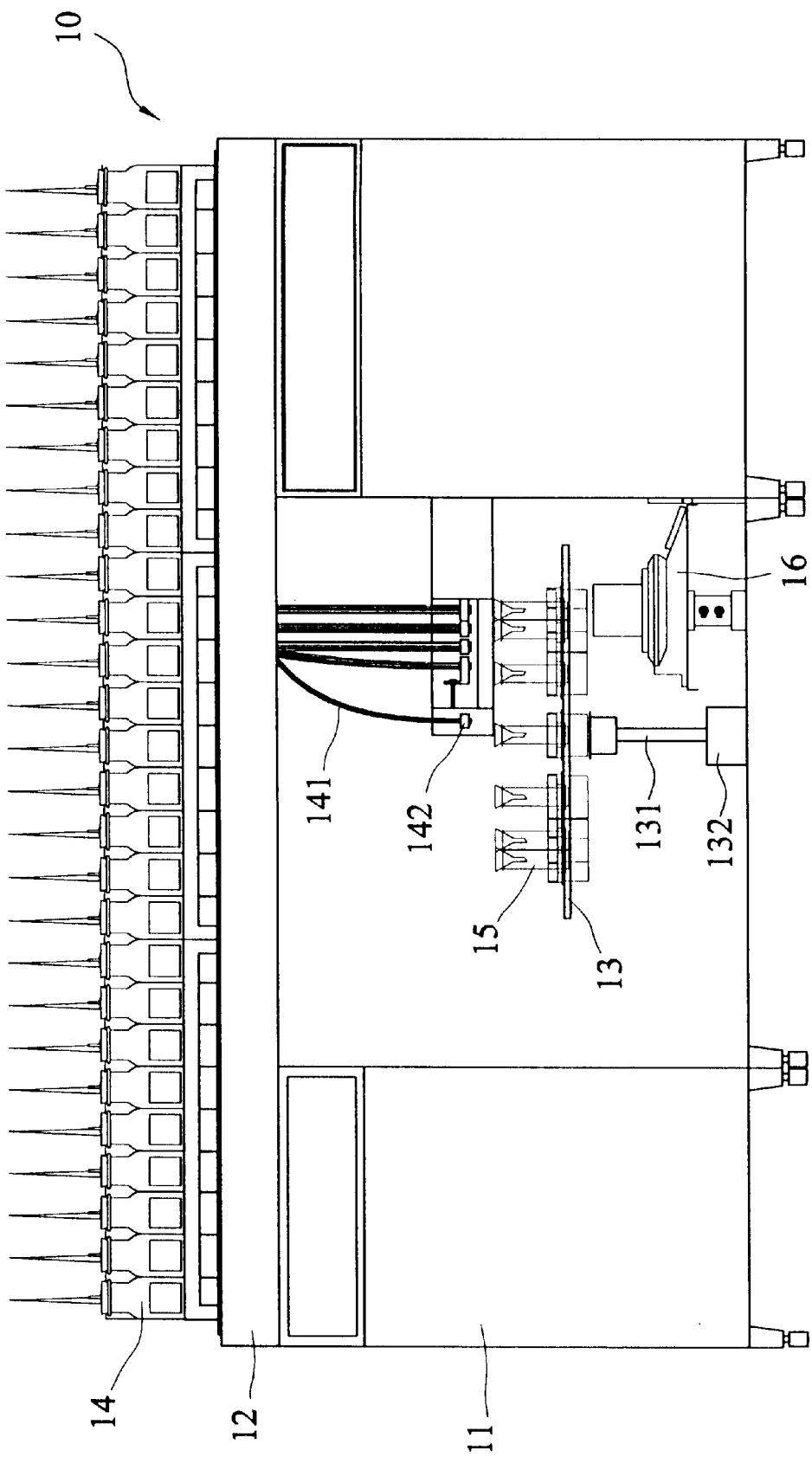
FIG. 2 is a front plan view of the conventional liquid dispensing and metering system of FIG. 1.
Figure 13:
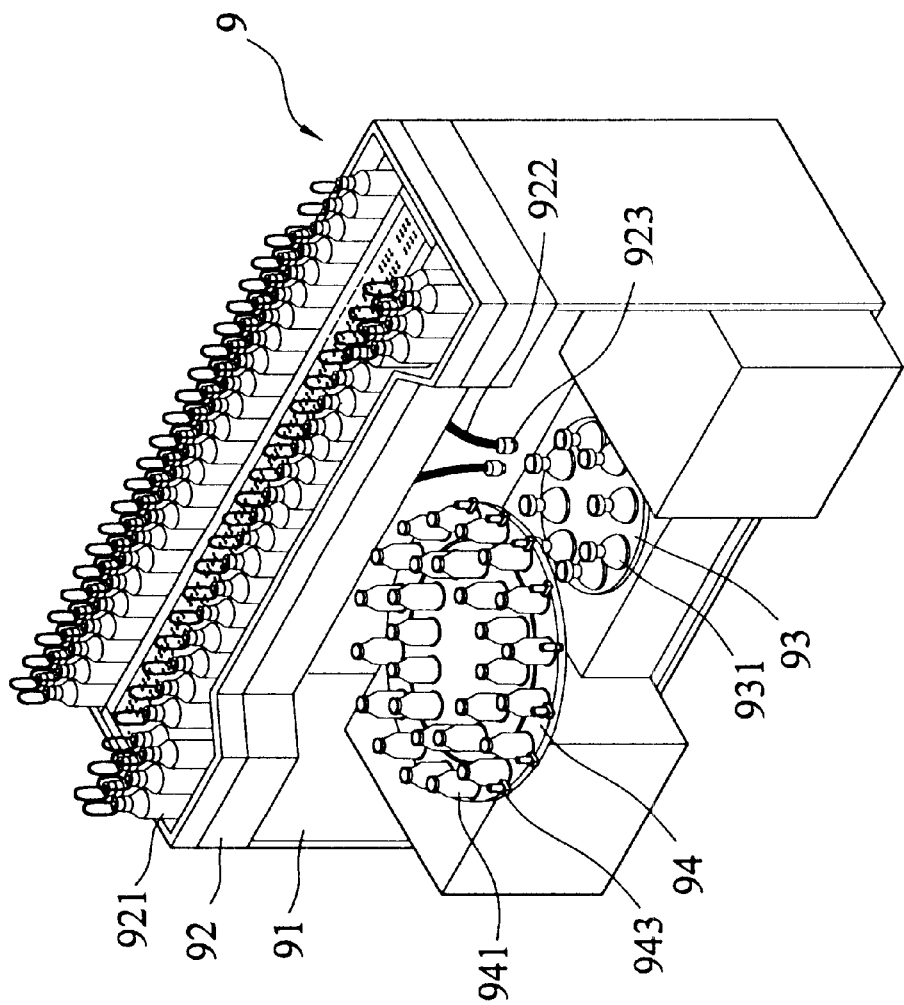
FIG. 13 is a perspective view showing a liquid dispensing and metering system in accordance with a fifth embodiment of the present invention.
Figure 14:
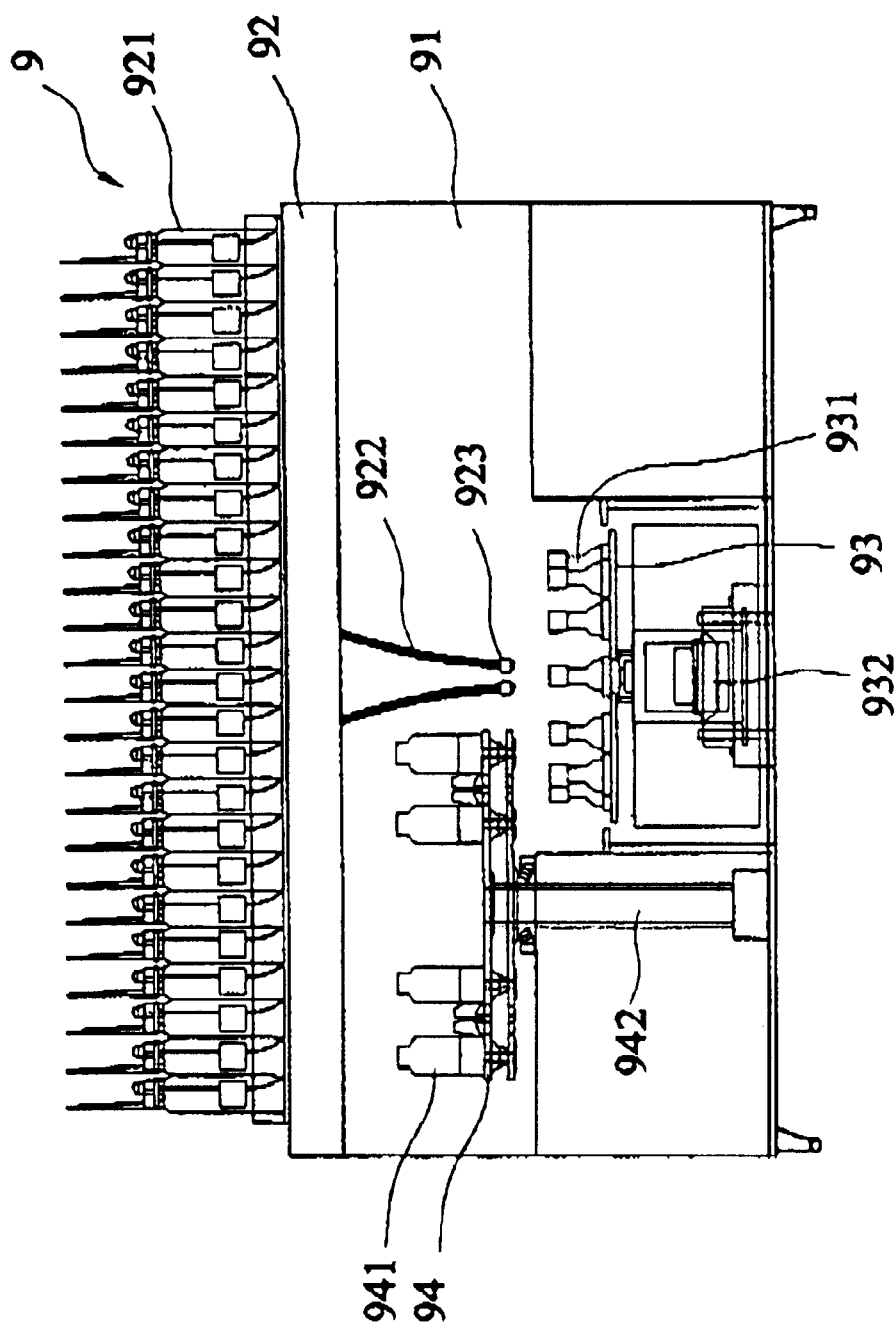
FIG. 14 is a top plan view of the liquid dispensing and metering system of FIG. 13.
Figure 15:
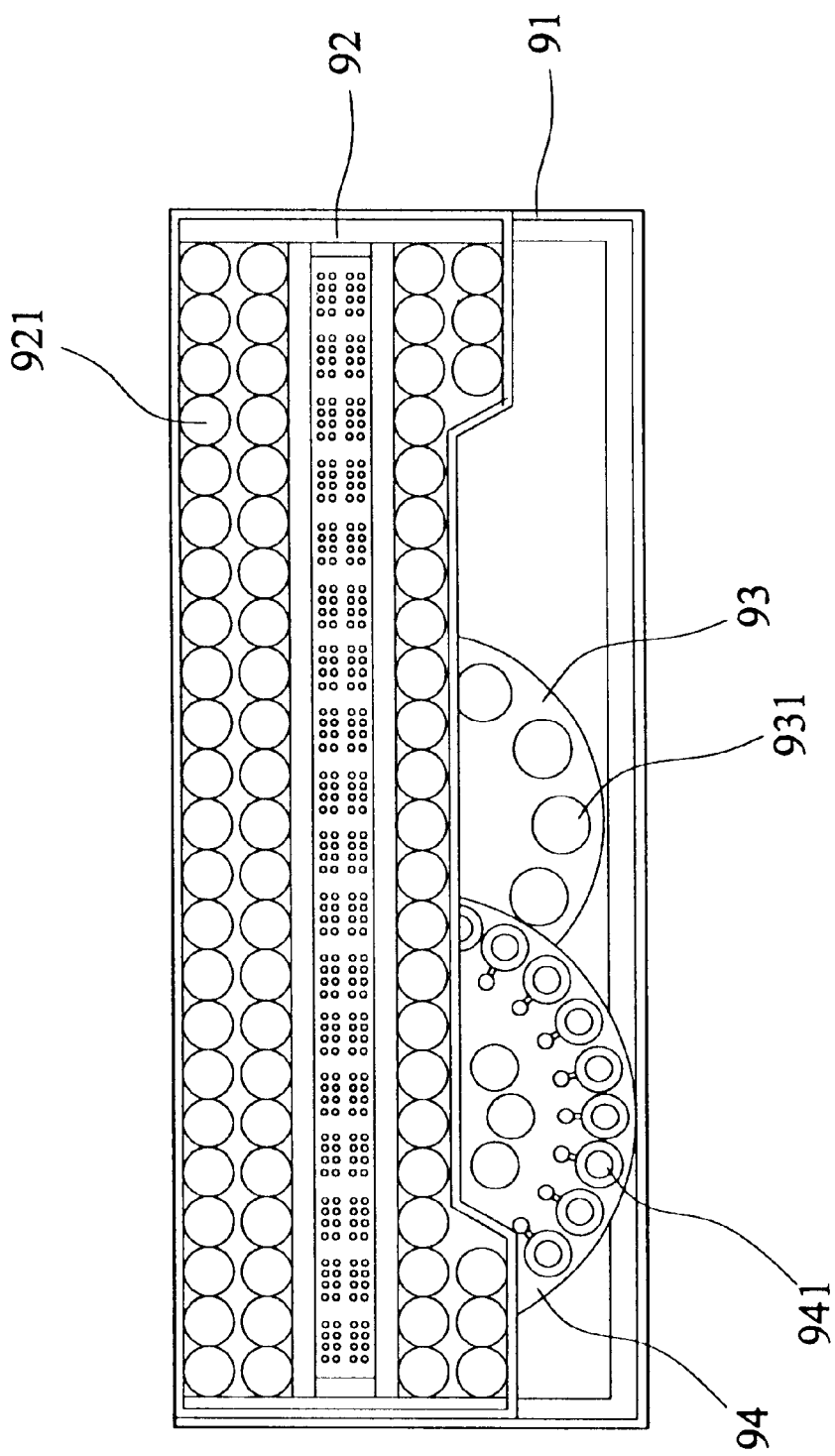
FIG. 15 is a front plan view of the liquid dispensing and metering system of FIG. 13.

FIG. 13 is a perspective view showing that the tubeless liquid dispensing and metering system shown in FIG. 3 may be combined with the prior art liquid dispensing and metering system shown in FIG. 1, in accordance with a fifth embodiment of the present invention. FIG. 14 is a top plan view of the liquid dispensing and metering system of FIG. 13, and FIG. 15 is a front plan view of the liquid dispensing and metering system of FIG. 13.

The liquid dispensing and metering system, generally indicated at 9, mainly including a casing 91, a supporting platform 92, a first turntable table 93, and a second turntable table 94. The first turntable table 93 and the second turntable table 94 are positioned in an inner space defined by the casing 91 and the supporting platform 92.

Similar to the prior art liquid dispensing and metering system shown in FIG. 1, a number of first group solution bottles 921 are supported and arranged on the supporting platform 92, used to contain a first group liquid material therein. A number of beakers 931 are supported on the first turntable table 93 in the manner of circular arrangement. Each of the first group solution bottles 921 is respectively connected with a pipe 922 at its top end to a dispensing head assembly 923 located above the first turntable table 93. An electronic scale 932 is disposed under the first turntable table 93, as shown in FIG. 15. Preferably, three electronic scales may be arranged under the first turntable table 93, substantially same to the multiple electronic scale configuration as shown in FIG. 3.

Similar to the liquid dispensing and metering system shown in FIG. 3, a number of second group solution bottles 941 are supported on the second turntable table 94 in the manner of circular arrangement, and each of which contains second group liquid material therein. The second turntable table 94 is supported and rotated by a central shaft 942 or a liftable supporting mechanism as described above.

Each of the second group solution bottles 941 is provided with an electromagnetic valve 943 formed on a bottom edge thereof and protruded from the peripheral edge of the second turntable table 94. The electromagnetic valve 943 may be actuated by an actuating unit as shown in FIG. 5A or FIG. 8B.

Under control of the control circuit of the system, the first group liquid material contained in the first group solution bottles 921 may be selectively drawn out of the respective solution bottle through the pipe 922 connected therebetween, and then dripped down into a selected beaker 931 via the dispensing head assembly 923. The weight of the first liquid material received in the beaker 931 may be measured by the electronic scale 932. Further, the second group liquid material contained in the second group solution bottles 941 may selectively flow out from the respective solution bottle through the electromagnetic valve 943 under control of the actuating unit, and then drip down into a selected beaker 931.

Figure 16:
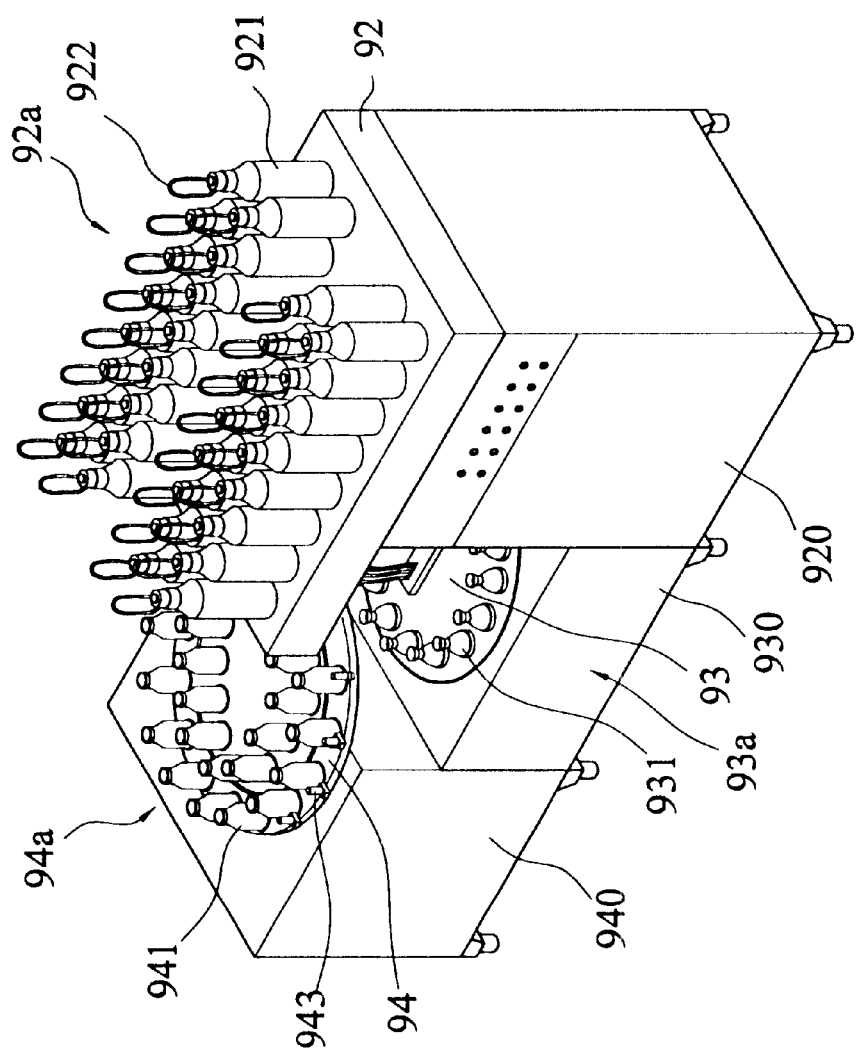
FIG. 16 is a perspective view showing a customized liquid dispensing and metering system in accordance with a sixth embodiment of the present invention.

FIG. 16 is a perspective view showing a liquid dispensing and metering system in accordance with a sixth embodiment of the present invention. The same reference numbers used in FIG. 13 of the fifth embodiment will be used to refer to the same or like parts.

Similar to the liquid dispensing and metering system of the fifth embodiment shown in FIG. 13, a number of first group solution bottles 921 are supported and arranged on the supporting platform 92, used to contain a first group liquid material therein. A number of beakers 931 are supported on the first turntable table 93 in the manner of circular arrangement. Each of the first group solution bottles 921 is respectively connected with a pipe 922 at its top end to a dispensing head assembly 923 located above the first turntable table 93. At least one electronic scale (not shown) is disposed under the first turntable table 93. Preferably, three electronic scales may be arranged under the first turntable table 93, substantially same to the multiple electronic scale configuration as shown in FIG. 3.

Further, a number of second group solution bottles 941 are supported on the second turntable table 94 in the manner of circular arrangement, and each of which contains second group liquid material therein. The second turntable table 94 is supported and rotated by a central shaft or a liftable supporting mechanism (not shown) as described in the previous embodiment.

Each of the second group solution bottles 941 is provided with an electromagnetic valve 943 formed on a bottom edge thereof and protruded from the peripheral edge of the second turntable table 94. The electromagnetic valve 943 may be actuated by an actuating unit, same as the previous embodiment described above.

The liquid dispensing and metering system of this embodiment includes a first casing 930 for supporting the first turntable table 93 and a number of beakers 931, forming a turntable table module 93a. A second casing 940 is used to support the second turntable table 94 and a number of second group solution bottles 941, forming a tubeless dispensing module 94a. A third casing 920 is used to support the supporting platform 92 and a number of first group solution bottles 921, forming a piped dispensing module 92a.

Figure 17:
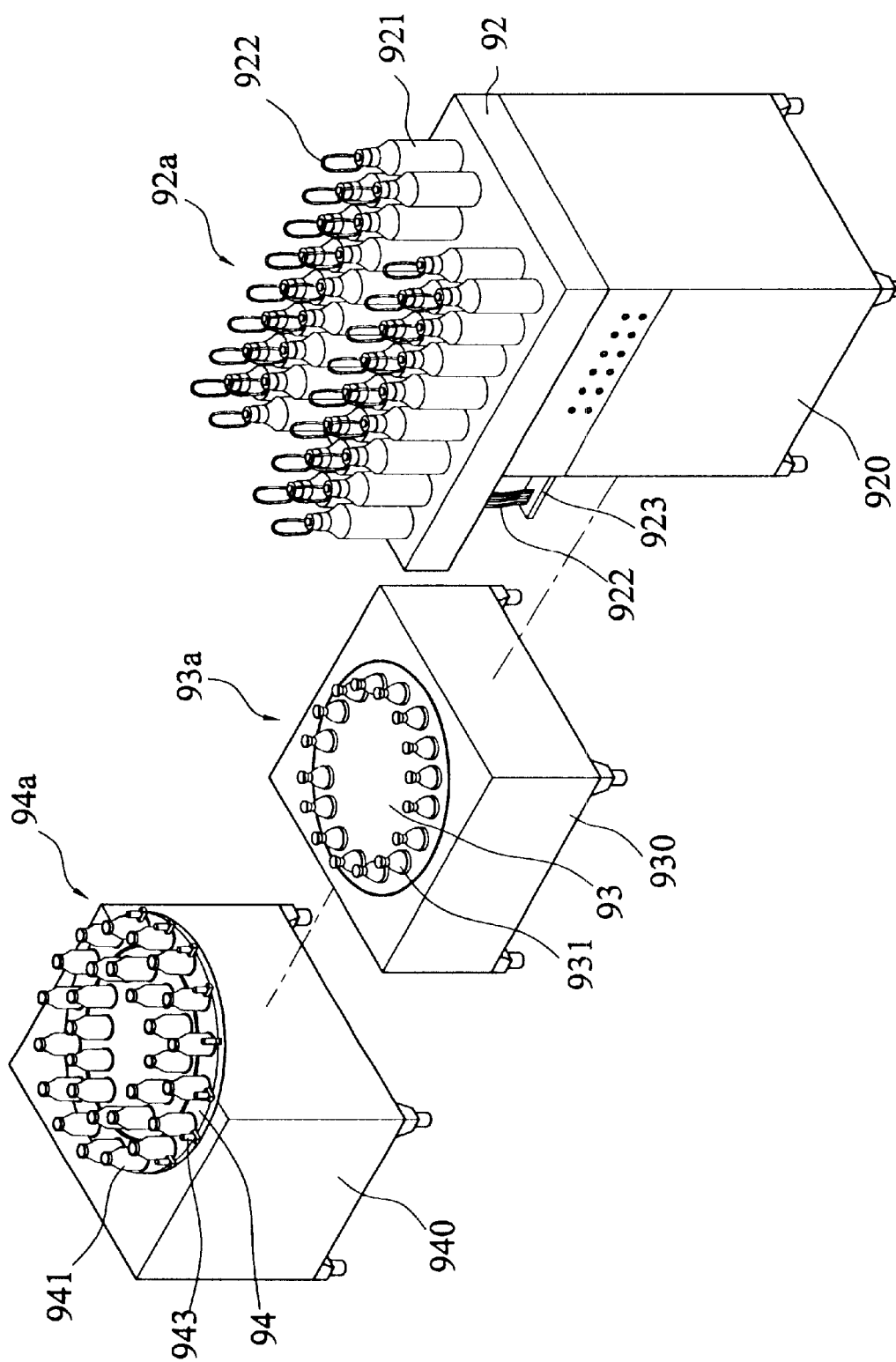
FIG. 17 is a perspective view showing the turntable table module, the tubeless dispensing module, and the piped dispensing module of FIG. 16 are separated.

The operation of the liquid dispensing and metering system of this embodiment is same to that of the fifth embodiment described above. However, the first casing 930, the second casing 940, and the third casing 920 are manufactured as separable casing structure, so that it is possible to separate the turntable table module 93a, the tubeless dispensing module 94a, and the piped dispensing module 92a, as shown in FIG. 17.

Figure 18:
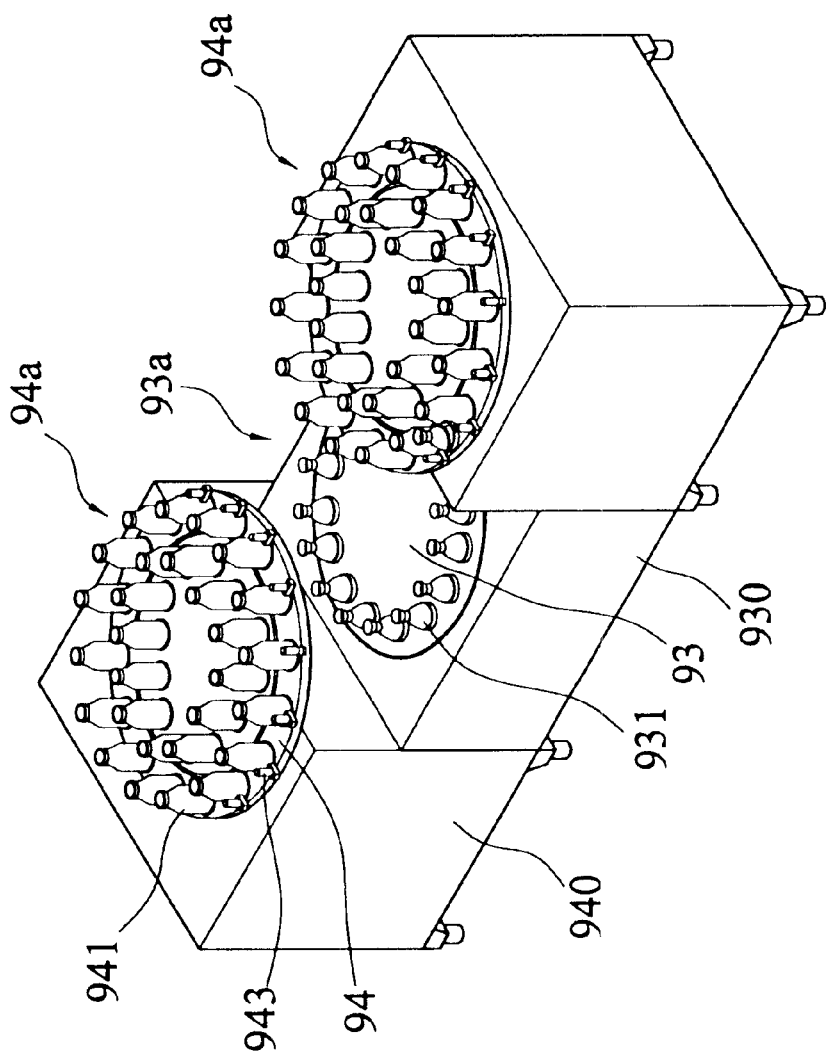
FIG. 18 is a perspective view showing a customized liquid dispensing and metering system, including a turntable table module and two tubeless dispensing modules.
Figure 19:
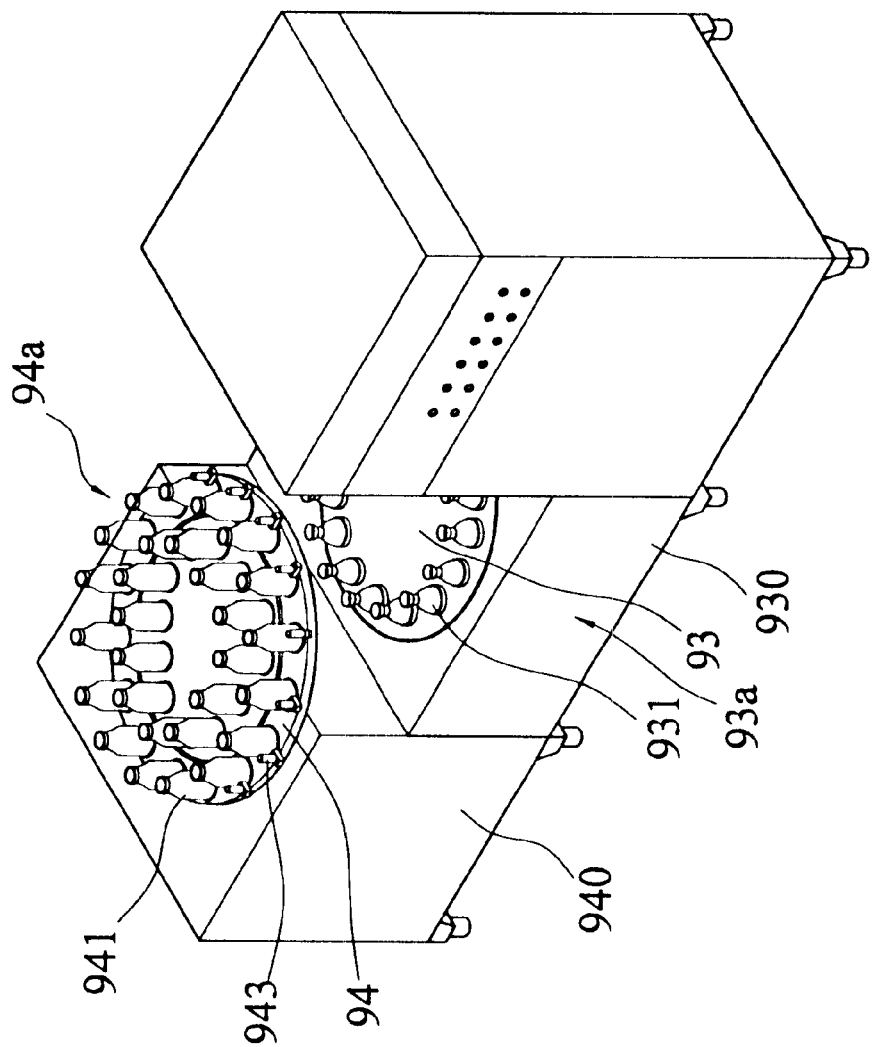
FIG. 19 is a perspective view showing a customized liquid. dispensing and metering system, including a turntable table module and a tubeless dispensing module.

Especially, the user may assemble a customized liquid dispensing and metering system to include one or more turntable table modules 93a, tubeless dispensing modules 94a, and/or piped dispensing modules 92a. For example, FIG. 18 shows a customized liquid dispensing and metering system, which includes a turntable table module 93a and two tubeless dispensing modules 94a. FIG. 19 shows another customized liquid dispensing and metering system, which includes a turntable table module 93a and a tubeless dispensing module 94a.

Although the present invention has been described with reference to the preferred embodiments, it is apparent to those skilled in the art that a variety of modifications and changes may be made without departing from the scope of the present invention which is intended to be defined by the appended claims.

What is claimed is:

1. A liquid dispensing and metering system, comprising:
   a casing having a supporting platform, defining an inner space;
   a plurality of first group solution bottles supported on the supporting platform for containing a first group liquid material therein,
   a first turntable disposed in the inner space of the casing;
   a dispensing head assembly located above the first turntable, having a plurality of dispensing heads;
   a plurality of pipes connected between the first group solution bottles and the dispensing heads respectively;
   a plurality of beakers supported on the first turntable, for receiving the first group liquid material drawn out from the first group solution bottles through the pipes and dispensing leads;
   a second turntable, arranged adjacent to the first turntable;
   a driving mechanism for supporting and rotating the second turntable;
   a plurality of second group solution bottles containing a second group liquid material therein, positioned on the second turntable, each of which being mounted with an electromagnetic valve formed on a bottom edge thereof,
   at least one actuating unit for energizing the electromagnetic valves of the second group solution bottles to allow the second group liquid material contained in the second group solution bottles to flow out via the electromagnetic valves; and
   at least one electronic scale arranged in the inner space of the casing for measuring the liquid material contained in the beakers.

2. The liquid dispensing and metering system as claimed in claim 1, wherein the electromagnetic valve comprises:
   a valve base with a flow channel therein;
   an inlet formed on a side wall of the valve base and communicated with the flow channel;
   an outlet formed on a bottom side of the valve base and communicated with the flow channel;
   a diaphragm disposed in the flow channel between the inlet and the outlet for controlling the second group liquid material contained in the second group solution bottle flowing from the inlet to the outlet;
   a sleeve mounted on the valve base;
   a movable shaft made of magnetic material, mounted in the sleeve, having its bottom end extending into the flow channel of the valve base and then mechanically coupled with the diaphragm; and
   a spring mounted in the sleeve and surrounding on the movable shaft for providing a bias force to the movable shaft.

3. The liquid dispensing and metering system as claimed in claim 1, wherein the actuating unit comprises:
   a cylinder having a movable shaft;
   a mask having a top end mounted on a bottom end of the movable shaft of the cylinder and having a bottom open end; and
   a coil accommodated in the mask, connected with a pair of conductive wires, an electrical power source being supplied to the coil through the conductive wires to energize the coil.

4. The liquid dispensing and metering system as claimed in claim 1, wherein the actuating unit comprises:
   a cylinder having a movable shaft;
   a mask having a top end mounted on a bottom end of the movable shaft of the cylinder and having a bottom open end; and
   a pair of coils accommodated in the mask, each of the coils being connected with a pair of conductive wires, an electrical power source being supplied to the coils through the conductive wires to energize the coils.

5. The liquid dispensing and metering system as claimed in claim 1, wherein the actuating unit comprises:
- a mask having a bottom open end, mounted on a top of the electromagnetic valve of the solution bottle; and
- a coil accommodated in the mask, connected with a pair of conductive wires, an electrical power source being supplied to the coil through the conductive wires to energize the coil.

6. The liquid dispensing and metering system as claimed in claim 1, wherein the driving mechanism further comprises a liftable supporting mechanism for lifting the second turntable between a lift position and a down position.

7. The liquid dispensing and metering system as claimed in claim 6, wherein the liftable supporting mechanism comprises:
- a supporting frame for supporting the turntable;
- a motor for rotating the turntable; and
- a driving cylinder for moving the turntable upwardly or downwardly with respect to the electronic scale.

8. A liquid dispensing and metering system, comprising:
- at least one piped dispensing module, further comprising:
  - a plurality of first group solution bottles supported on the piped dispensing module for containing a first group liquid material therein;
  - a dispensing head assembly having a plurality of dispensing heads;
  - a plurality of pipes connected between the first group solution bottles and the dispensing heads respectively;
- at least one tubeless dispensing module, further comprising:
  - a second turntable;
  - a driving mechanism for supporting and rotating the second turntable;
  - a plurality of second group solution, bottles containing a second group liquid material therein, positioned on the second turntable, each of which being mounted with an electromagnetic valve formed on a bottom edge thereof;
  - at least one actuating unit for energizing the electromagnetic valves of the second group solution bottles to allow the second group liquid material contained in the second group solution bottles to flow out via the electromagnetic valves;
- at least one turntable module, further comprising:
  - a first turntable:
  - a number of beakers supported on the first turntable for receiving the first group liquid material drawn out from the first group solution bottles through the pipes and dispensing heads, and for receiving the second group liquid material drawn out from the second group solution bottles through the electromagnetic valves thereof; and
- at least one electronic scale for measuring the liquid material contained in the beakers.

9. The liquid dispensing and metering system as claimed in claim 8, wherein the piped dispensing module, the tubeless dispensing module, and the turntable module are supported by a casing respectively.

10. A liquid dispensing and metering system, comprising:
- at lest one tubeless dispensing module, further comprising:
  - a second turntable;
  - a driving mechanism for supporting and rotating the second turntable;
  - a plurality of solution bottles containing a liquid material therein, positioned on the turntable, each of which being mounted with an clectomagnetic valve formed on a bottom edge thereof;
- at least one actuating unit for energizing the electromagnetic valves of the solution bottles to allow the liquid material contained in the solution bottles to flow out via the electromagnetic valves;
- at least one turntable module, further comprising:
- a first turntable;
- a number of beakers supported on the first turntable for receiving the liquid material drawn out from the solution bottles through the electromagnetic valve thereof; and
- at least one electronic scale for measuring the liquid material contained in the beakers.

11. The liquid dispensing and metering system as claimed in claim 10, wherein the tubeless dispensing module and the turntable module are supported by a casing respectively.

12. A liquid dispensing and entering system, comprising;
- at least one turntable;
- a driving mechanism for supporting and rotating the turntable;
- a plurality of solution bottles containing a liquid material therein, positioned on the turntable, each of which being mounted with an electromagnetic valve formed on a bottom edge thereof, the electromagnetic valve including:
  - (a) a valve base with a flow channel therein;
  - (b) a inlet formed on a side wall of the valve base and communicated with the flow channel;
  - (c) an outlet formed on a bottom side of the valve base and communicated with the flow channel;
  - (d) a diaphragm disposed in the flow channel between the inlet and the outlet for controlling the liquid material contained in a respective solution bottle flowing form the inlet to the outlet;
  - (e) a sleeve mounted on the valve base; a movable shaft made of magnetic material, mounted in the sleeve, having its bottom end extending into the flow channel of the valve base and then mechanically coupled with the diaphragm; and
  - (f) a spring mounted in the sleeve and surrounding on the movable
    shaft for providing a bias force to the movable shaft;
- at least one actuating unit for energizing the electromagnetic valves of the solution bottles to allow the liquid material contained in the solution bottles to flow out via the electromagnetic valves; and,
- at least one electronic scale arranged under the turntable and provided with a beaker thereon corresponding to the electromagnetic valve of a respective solution bottle, for measuring the liquid material dripped down into the beaker from the respective solution bottle.

13. A liquid dispensing and metering system, comprising:
- at least one turntable;
- a driving mechanism for supporting arid rotating the turntable;
- a plurality of solution bottles containing a liquid material therein, positioned on the turntable, each of which being mounted with an electromagnetic valve formed on a bottom edge thereof;
- at least one actuating unit for energizing the electromagnetic valves of the solution bottles to allow the liquid material contained in the solution bottles to flow out via the electromagnetic valves, the actuating unit including:

(a) a cylinder having a movable shaft, (b) a mask having a top end mounted on a bottom end of the movable shaft of the cylinder and having a bottom open end; and (c) a coil accommodated in the mask, connected with a pair of conductive wires, an electrical power source being supplied to the coil through the conductive wires to energize the coil; and, at least one electronic scale arranged under the turntable and provided with a beaker thereon corresponding to the electromagnetic valve of a respective solution bottle, for measuring the liquid material dripped down into the beaker from the respective solution bottle.

14. A liquid dispensing and metering system, comprising:

at least one turntable:

a driving mechanism for supporting and rotating the turntable;

a plurality of solution bottles containing a liquid material therein, positioned on the turntable, each of which being mounted with an electromagnetic valve formed on a bottom edge thereof;

at least one actuating unit for energizing the electromagnetic valves of the solution bottles to allow the liquid material contained in the solution bottles to flow out via the electromagnetic valves, the actuating unit including:

(a) a cylinder having a movable shaft;

(b) a mask having a top end mounted on a bottom end of the movable shaft of the cylinder and having a bottom open end; and (c) a pair of coils accommodated in the mask, each of the coils being connected with a pair of conductive wires, an electrical power source being supplied to the coils through the conductive wires to energize the coils; and, at least one electronic scale arranged under the turntable and provided with a beaker thereon corresponding to the electromagnetic valve of a respective solution bottle, for measuring the liquid material dripped down into the beaker from the respective solution bottle.

15. A liquid dispensing and metering system, comprising:

at least one turntable;

a driving mechanism for supporting and rotating the turntable;

a plurality of solution bottles containing a liquid material therein, positioned on the turntable, each of which being mounted with an electromagnetic valve formed on a bottom edge thereof;

at least one actuating unit for energizing the electromagnetic valves of the solution bottles to allow tile liquid material contained in the solution bottles to flow out via the electromagnetic valves, the actuating unit including:

(a) a mask having a bottom open end, mounted on a top of the electromagnetic valve of the solution bottle; and (b) a coil accommodated in the mask, connected with a pair of conductive wires, an electrical power source being supplied to the coil through the conductive wires to energize the coil; and, at least one electronic scale arranged under the turntable and provided with a beaker thereon corresponding to the electromagnetic valve of a respective solution bottle, for measuring the liquid material dripped down into the beaker from the respective solution bottle.

16. A liquid dispensing and metering system, comprising:

at least one turntable;

a driving mechanism for supporting and rotating the turntable;

a plurality of solution bottles containing a liquid material therein, positioned on the turnable, each of which being mounted with an electromagnetic valve formed on a bottom edge thereof;

at least one actuating unit for energizing the electromagnetic valves of the solution bottles to allow the liquid material contained in the solution bottles to flow out via the electromagnetic valves; and, three electronic scales being arranged under the turntable and along the peripheral edge of the turntable, so that the three electronic scales are respectively corresponding to the electromagnetic valves of three continuously adjacent solution bottles.

17. A liquid dispensing and metering system comprising:

at least one turntable;

a driving mechanism for supporting and rotating the turntable, the driving mechanism including a liftable supporting mechanism for lifting the turntable between a lift position and a down position;

a plurality of solution bottles containing a liquid material therein, positioned on the turntable, each of which being mounted with an electromagnetic valve formed on a bottom edge thereof;

at least one actuating unit for energizing the electromagnetic valves of the solution bottles to allow the liquid material contained in the solution bottles to flow out via the electromagnetic valves; and at least one electronic scale arranged under the turntable and provided with a beaker thereon corresponding to the electromagnetic valve of a respective solution bottle for measuring the liquid material dripped down into the beaker from tile respective solution bottle.

18. The liquid dispensing and metering system as claimed in claim 17, wherein the liftable supporting mechanism comprises:

a supporting frame for supporting the turntable;

a motor for rotating the turntable; and a driving cylinder for moving the turntable upwardly or downwardly with respect to the electronic scale.

* * * * *